US007489338B2

(12) United States Patent
Huang et al.

(10) Patent No.: US 7,489,338 B2
(45) Date of Patent: Feb. 10, 2009

(54) AUTOMATIC COLOR-SYNC POLARITY CONTROL

(75) Inventors: Wen Huang, San Jose, CA (US); Brad Delanghe, Sunnyvale, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 603 days.

(21) Appl. No.: 11/205,600

(22) Filed: Aug. 17, 2005

(65) Prior Publication Data

US 2007/0040945 A1 Feb. 22, 2007

(51) Int. Cl.
*H04N 9/79* (2006.01)
*H04N 9/89* (2006.01)
*H04N 17/02* (2006.01)
*H04N 9/45* (2006.01)

(52) U.S. Cl. .................. 348/194; 348/505; 348/507; 386/10; 386/19

(58) Field of Classification Search ........... 348/180, 348/194, 505–509; 386/10, 19
See application file for complete search history.

(56) References Cited

U.S. PATENT DOCUMENTS

| 4,337,477 | A | * | 6/1982 | Sagishima et al. | 348/509 |
| 4,383,273 | A | * | 5/1983 | Lunn | 348/725 |
| 4,706,110 | A | * | 11/1987 | Richter | 348/509 |
| 4,941,035 | A | * | 7/1990 | Judge | 348/180 |
| 4,970,581 | A | * | 11/1990 | O'Gwynn | 348/527 |
| 7,224,407 | B2 | * | 5/2007 | Yoshii et al. | 348/638 |

\* cited by examiner

*Primary Examiner*—Victor R Kostak
(74) *Attorney, Agent, or Firm*—McAndrews, Held & Malloy, Ltd.

(57) ABSTRACT

A system and method for automatically controlling color synchronization polarity during video decoding. Various aspects of the present invention may comprise at least one module that is adapted to monitor color synchronization polarity at a plurality of instances over a period of time. The at least one module may also, for example, be adapted to generate a sequence of signals indicative of the color synchronization polarity correctness at the plurality of instances. The at least one module may additionally, for example, be adapted to statistically analyze the sequence of signals. The at least one module may further, for example, be adapted to determine, based at least in part on the statistical analysis of the sequence of signals, whether color synchronization polarity is correct. The at least one module may still further, for example, be adapted to control color synchronization polarity based, at least in part, on the polarity correctness determination.

22 Claims, 5 Drawing Sheets

AUTOMATIC COLOR-SYNC POLARITY CONTROL

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Video communication signals may generally utilize a modulated subcarrier to communicate video information. For example, various video communication signals may communicate video color information by phase-modulating a subcarrier signal. A receiver of such information may then extract the communicated video information by processing the phase-modulated subcarrier signal (e.g., in conjunction with a reference subcarrier signal). Such a reference subcarrier signal may, for example, be communicated directly to the receiver (e.g., as a subcarrier burst signal) or may be derived by the receiver.

In various video communication techniques, polarity of the modulated subcarrier and/or reference subcarrier may change. By way of illustration, the Phase Alternation Line (PAL) video standard includes inverting the polarity of the color signal component between adjacent scan lines. Therefore, processing such a signal may include utilizing polarity information. For example, in processing such a PAL television signal, the color synchronization process may include generating a switching signal to track PAL signal polarity changes (e.g., alternating on a line-by-line basis). Such a switching signal may, for example, be produced by processing subcarrier burst information. However, the generation of such a switching signal may be susceptible to noise. For example, noise may result in a switching signal changing state when the polarity of the subcarrier has not changed. An incorrect switching signal may then, in turn, cause incorrect processing of the modulated subcarrier, which may result in a relatively poor quality video presentation.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for automatically controlling color synchronization polarity during video decoding, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
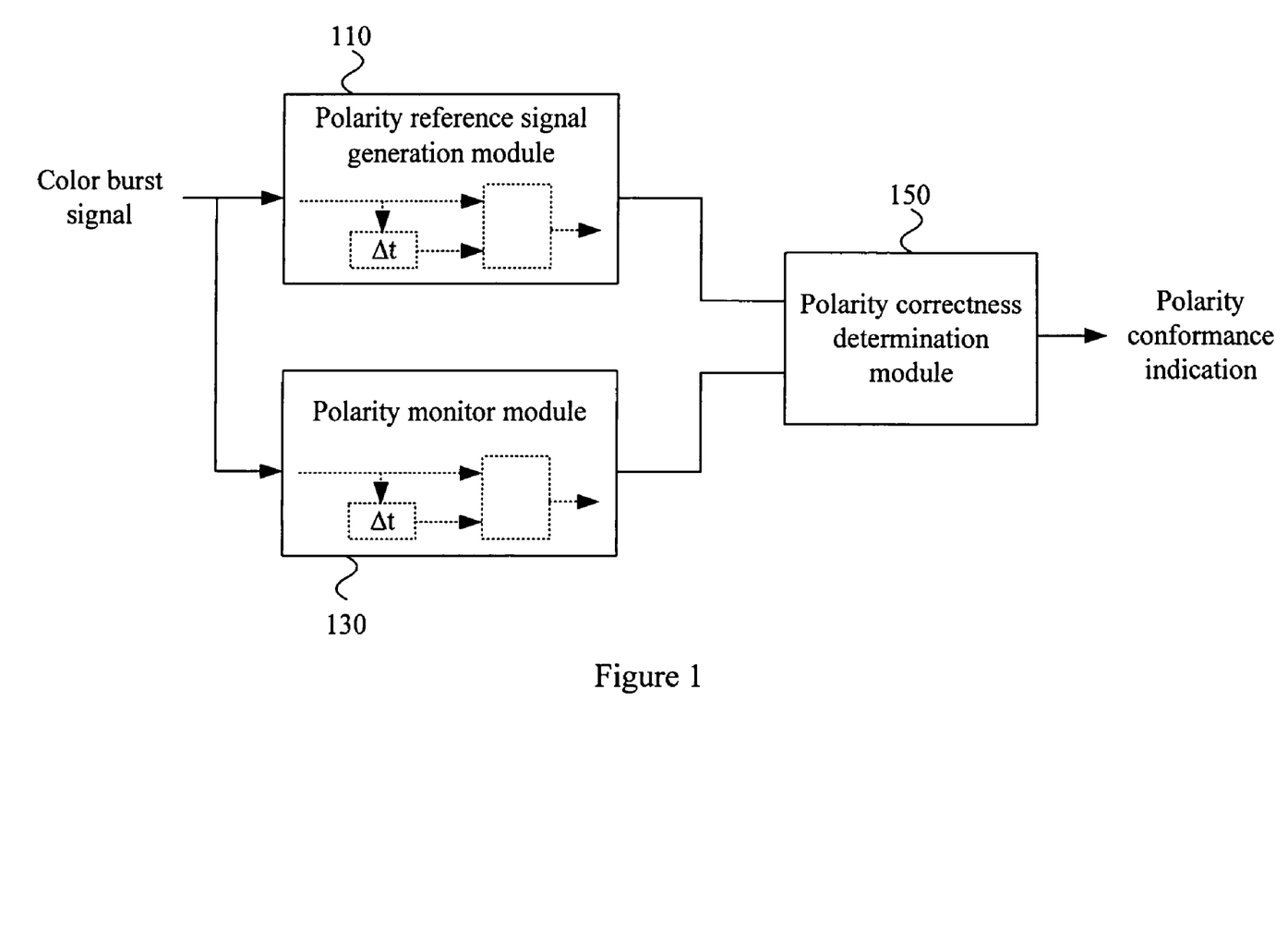
FIG. 1 is a block diagram of a system for controlling color synchronization polarity in a video decoder, in accordance with various aspects of the present invention.

FIG. 1 is a block diagram of a system 100 for controlling color synchronization polarity in a video decoder, in accordance with various aspects of the present invention. As explained previously, in processing certain types of video signals, polarity of the video signal (e.g., a subcarrier and/or subcarrier reference) may change. By way of non-limiting example, the Phase Alternation Line ("PAL") video standard includes inverting the polarity of the color signal component between adjacent scan lines. The polarity of the color synchronization signal may also change between adjacent video lines, and knowledge of such color synchronization polarity may be utilized in processing the color signal component. Though the following discussion may at times refer to the PAL video standard for illustrative purposes, the scope of various aspects of the present invention should not be limited by particular characteristics of the PAL video standard.

The exemplary system 100 may comprise a polarity reference signal generation module 110, which may also be referred to herein as the "reference generation module 110." The exemplary system 100 may also comprise a polarity monitor module 130 and a polarity correctness determination module 150, which may also be referred to herein as the "analysis module 150." Each of such modules will now be discussed in further detail.

The polarity monitor module 130 may generally be adapted to monitor polarity of a color synchronization signal, which may also be referred to herein as color synchronization polarity. For example and without limitation, the polarity monitor module 130 may monitor color synchronization polarity by processing color synchronization signal information corresponding to adjacent video lines.

The polarity monitor module 130 may, for example, monitor color synchronization polarity at a plurality of instances over a period of time. For example and without limitation, the polarity monitor module 130 may monitor color synchronization polarity of a subcarrier burst signal of a video line at a plurality of points (e.g., 2, 4, 8, 16, 32, 64, 100 or any number of points) during the subcarrier burst period. Also for example, the polarity monitor module 130 may monitor color synchronization polarity of the subcarrier burst signal for a plurality of video lines (e.g., 2, 4, 8, 100, all lines of a video field, all lines of a video frame, all lines of a plurality of video frames, a sliding window of video lines, etc.). Note that the period of time over which color synchronization polarity may be monitored might comprise a single continuous period or might comprise a set of discrete periods. Also note that the period of time may be static or dynamic, which will be discussed in more detail later. The scope of various aspects of the present invention should not be limited by characteristics of any particular period of time over which color synchronization polarity might be monitored.

The polarity monitor module 130 may monitor color synchronization polarity in any of a variety of manners. For example and without limitation, the polarity monitor module 130 may monitor color synchronization polarity by determining polarity of a monitored color synchronization signal (e.g., a PAL subcarrier burst signal) of a current video line in relation to polarity of a monitored color synchronization signal of a previous video line. Such a comparison may then, for example, result in an indication of relative color synchronization polarity between adjacent video lines. Also for example, the polarity monitor module 130 may monitor color synchronization polarity by comparing polarity of a monitored color synchronization signal of a current video line with respective polarities of a plurality of previous video lines. The scope of various aspects of the present invention should not be limited by characteristics of any particular manner of monitoring color synchronization polarity.

The polarity monitor module 130 may then, for example, generate and output one or more signals indicative of such monitored color synchronization polarity. For example and without limitation, the polarity monitor module 130 may generate and output a sequence (or series) of signals indicative of the monitored color synchronization polarity at a plurality of instances over a period of time. Such a sequence of signals may, for example, indicate color synchronization polarity of a sampled reference subcarrier relative to a corresponding sampled reference subcarrier of a previous video line. Also for example, the polarity monitor module 130 may generate and output any of a large variety of signals (e.g., digital and/or analog signals) indicative of monitored color synchronization polarity at a plurality of instances over a period of time. Accordingly, the scope of various aspects of the present invention should not be limited by characteristics of any particular type of signal that might represent monitored color synchronization polarity.

The reference generation module 110 may, in various non-limiting exemplary scenarios, generate a reference signal. Such a reference signal may, for example, indicate desired color synchronization polarity. Such a reference signal may, for example, be utilized for comparison with a corresponding signal representative of monitored color synchronization polarity (e.g., as might be generated by the polarity monitor module 130).

In a non-limiting exemplary scenario, the reference generation module 110 may generate a reference signal the comprises a sequence of signals indicative of desired color synchronization polarity over the period of time for which the polarity monitor module 130 monitors the color synchronization polarity. For example and without limitation, a signal of such a sequence of signals may indicate desired color synchronization polarity of a color synchronization signal (e.g., a PAL subcarrier burst signal) for a current video line relative to a color synchronization signal of a previous video line. Also for example, a reference signal may comprise characteristics of an analog signal or a digital signal (e.g., containing sign, phase or data information). Accordingly, the scope of various aspects of the present invention should not be limited by characteristics of any particular type of signal.

The analysis module 150 may analyze information of monitored color synchronization polarity (e.g., as generated by the polarity monitor module 130) to determine whether the monitored color synchronization is correct. For example, when a video standard (e.g., PAL) specifies a particular polarization or polarization pattern, the analysis module 150 may analyze monitored polarity information to determine whether the monitored polarity conforms to the standard.

The analysis module 150 may analyze information of monitored color synchronization in any of a variety of manners. For example and without limitation, the analysis module 150 may statistically analyze information of monitored color synchronization polarity generated by the polarity monitor module 130. The analysis module 150 may then, for example, generate a signal indicative of such statistical analysis. Such a signal may, for example, be utilized to switch color synchronization polarity to achieve proper video signal decoding.

In a non-limiting exemplary scenario, as discussed previously, the polarity monitor module 130 may generate a sequence of signals indicative of monitored color synchronization polarity. In such a non-limiting exemplary scenario, the analysis module 150 may analyze (e.g., statically analyze) such a sequence of signals to determine whether the monitored color synchronization polarity is correct.

In another non-limiting exemplary scenario, as discussed previously, the polarity monitor module 130 may generate a sequence of signals indicative of monitored color synchronization polarity, and the reference generation module 110 may generate a sequence of reference signals indicative of correct (e.g., desired, expected, or conforming to the PAL standard or some other standard) color synchronization polarity. In such an exemplary scenario, the analysis module 150 may analyze (e.g., statistically analyze) the monitored polarity sequence and the reference polarity sequence to determine whether the color synchronization polarity is correct.

Continuing the non-limiting exemplary scenario, the analysis module 150 may compare corresponding signal pairs of the monitored polarity sequence and the reference polarity sequence. Such comparison may, for example, comprise multiplying such signal pairs, logic gating such signal pairs, etc. As a result of such comparison, the analysis module 150 may generate a sequence (or series) of signals indicative of the comparison results. The analysis module 150 may then, for example, analyze the comparison results sequence to determine whether the comparison results sequence indicates that the monitored color synchronization polarity is correct.

Continuing the non-limiting exemplary scenario, the analysis module 150 may statistically analyze the comparison results sequence by accumulating logic values, polarities, values, or signs over a time period (e.g., any of the time periods discussed previously) and comparing the accumulation results to a threshold. Also for example, the analysis module 150 may statistically analyze the comparison results sequence by summing the values of the signals over a time period and comparing the sum to a threshold. Further for example, the analysis module 150 may statistically analyze the comparison results sequence by determining an indication of statistical variance (or standard deviation) and comparing the indication of statistical variance to a threshold. In general, in the non-limiting exemplary scenario, the analysis module 150 may analyze (e.g., statistically analyze) comparison results between a reference polarity signal (or sequence of signals) and a monitored polarity signal (or sequence of signals) in any of a variety of manners. Accordingly, the scope of various aspects of the present invention should not be limited by characteristics of any particular manner of analyzing such signals.

In general, the analysis module 150 may analyze one or more signals (e.g., a sequence of signals) indicative of monitored color synchronization polarity, and determine based at least in part on the statistical analysis of such signals, whether color synchronization polarity is correct. Accordingly, the scope of various aspects of the present invention should not be limited by any particular manner of analyzing one or more signals indicative of monitored color synchronization polarity signals.

The analysis module 150 may perform analysis in a static or dynamic manner. For example and without limitation, the analysis module 150 may analyze signals indicative of monitored color synchronization polarity (e.g., and corresponding reference signals) in a constant manner. Alternatively for example, the analysis module 150 may analyze signals indicative of monitored color synchronization polarity in a manner that may change over time. For example, the analysis module 150 may determine effectiveness of the particular analysis currently being performed and determine whether to modify characteristics of the analysis to improve the effectiveness.

The analysis module 150 may determine effectiveness of color synchronization polarity control in any of a variety of manners. For example and without limitation, the analysis module 150 may determine effectiveness by, at least in part, determining video output quality. Note that such a determination may be completely automatic or may also utilize information received from a user. Also for example, the analysis module 150 may determine effectiveness by, at least in part, determining the extent to which color synchronization polarity is switched (or inappropriately switched). Further for example, the analysis module 150 may determine effectiveness by, at least in part, determining the extent to which color synchronization polarity is corrected. Accordingly, the scope of various aspects of the present invention should not be limited by characteristics of any particular manner of determining effectiveness of color synchronization polarity control.

In an exemplary scenario where it is determined that the effectiveness of the current manner of controlling color synchronization polarity is too low, the analysis module 150 may modify characteristics of the analysis. The analysis module 150 may modify the analysis characteristics in any of a variety of manners. For example and without limitation, in an exemplary scenario where the analysis includes comparison to a threshold, the analysis module 150 may modify the threshold. Also for example, the analysis module 150 may modify the period of time over which the analysis is performed (e.g., changing a sliding window duration, number of lines, number of fields/frames, etc.). Further for example, the analysis module 150 may change a set of signals that is being analyzed. Still further for example, the analysis module 150 may modify the number of signals or samples being processed. Accordingly, the scope of various aspects of the present invention should not be limited by any particular manner in which the analysis may be modified to improve effectiveness of the color synchronization polarity control.

The analysis module 150 may also, for example, generate a signal indicative of whether the color synchronization polarity is correct (e.g., as expected, as desired, in conformance with a standard, etc.). Such a signal may then, for example, be utilized to adjust color synchronization polarity if necessary. In a non-limiting exemplary scenario where such a signal indicates that color synchronization polarity is not presently correct, such a signal may be utilized as a switching signal to switch color synchronization polarity. Such a polarity switch may then, for example, provide for accurate color decoding of the video signal.

The exemplary system 100 was presented above in a modular manner for illustrative clarity. It should be recognized, however, that the various modules discussed previously may be implemented in any of a variety of manners. For example, the various modules may be implemented in hardware, software or a combination thereof. Also for example, the various modules may share various components. For example, various modules may share various hardware components and/or various software modules. Accordingly, the scope of various aspects of the present invention should not be limited by any particular module implementation or by any arbitrary boundaries between modules.

The previous exemplary system 100 was presented to provide specific illustrations of various generally broader aspects of the present invention. Accordingly, the scope of various aspects of the present invention should not be limited by characteristics of the previously discussed exemplary system 100.

Figure 2:
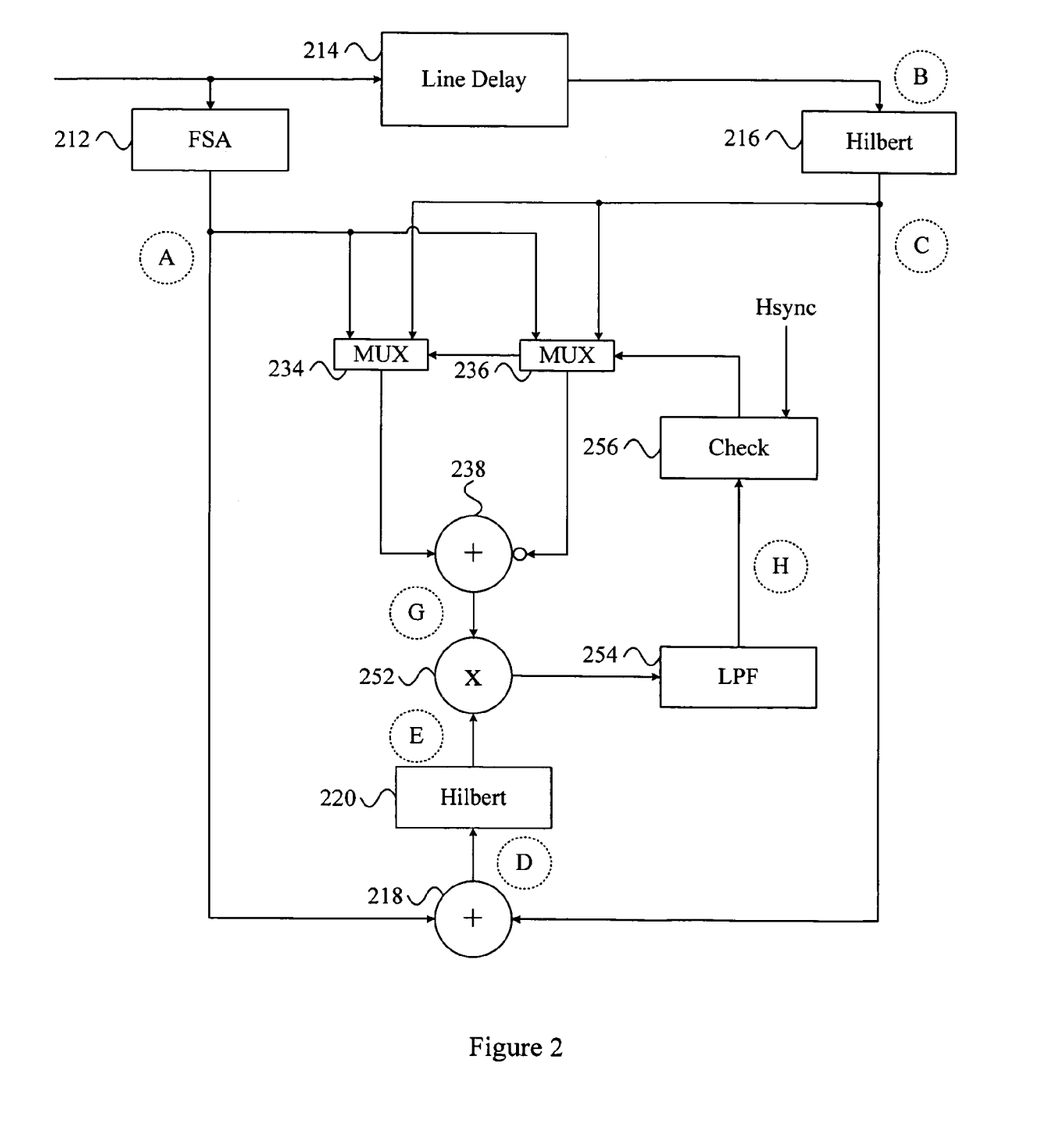
FIG. 2 is a block diagram of a system for controlling color synchronization polarity in a video decoder, in accordance with various aspects of the present invention.

FIG. 2 is a block diagram of a system 200 for controlling color synchronization polarity in a video decoder, in accordance with various aspects of the present invention. Various components of the exemplary system 200 may, for example and without limitation, share various characteristics with the exemplary system 100 illustrated in FIG. 1 and discussed previously.

Figure 3:
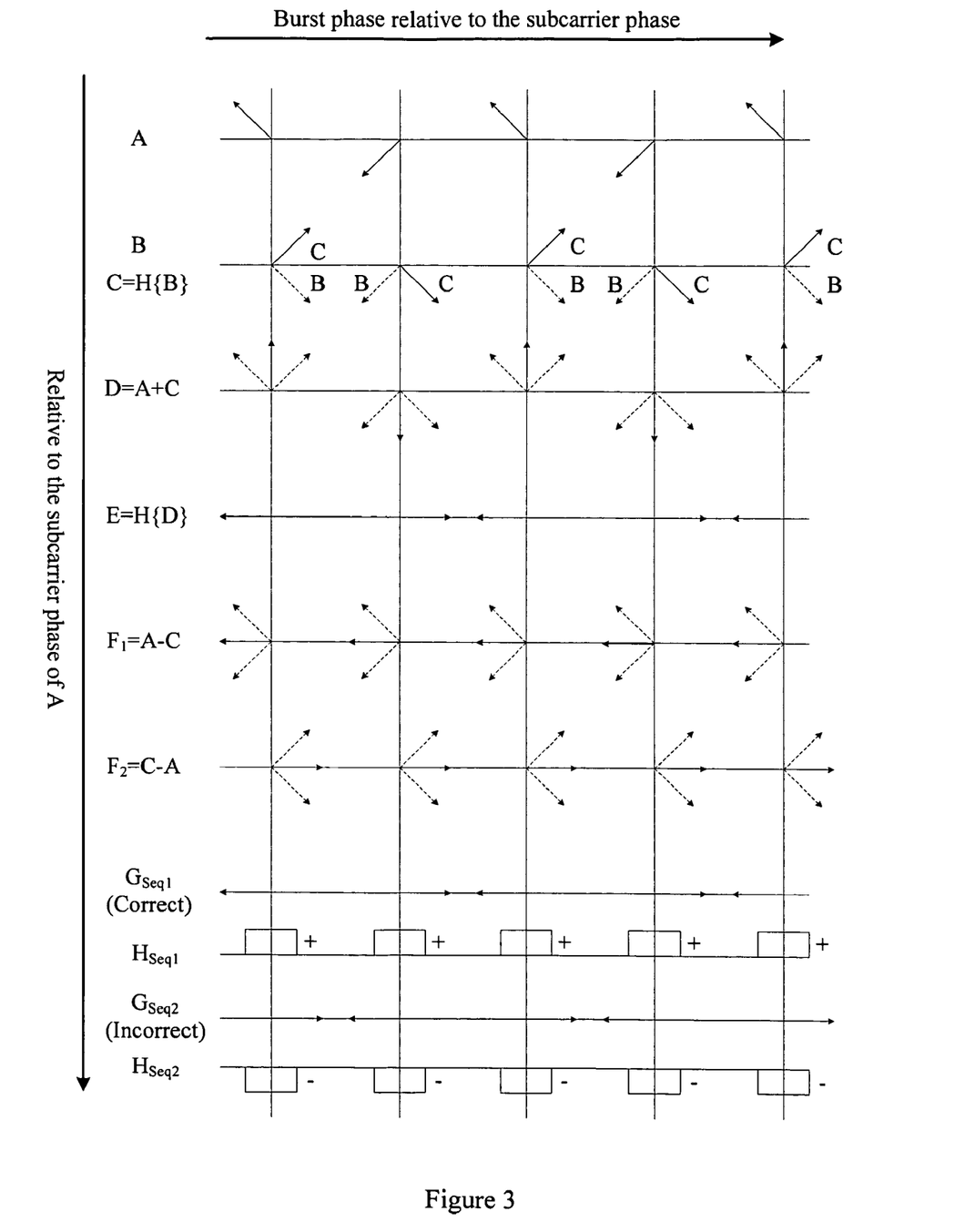
FIG. 3 is a vector diagram illustrating operation of the system of FIG. 2, in accordance with various aspects of the present invention.

FIG. 3 is a vector diagram 300 illustrating operation of the system of FIG. 2, in accordance with various aspects of the present invention. In discussing operation of the exemplary system 200, the following discussion will refer to the vector diagram 300. The vector diagram 300 is arranged in rows and columns, with each column representing a video line and each row generally representing a signal that is also labeled in the system block diagram 200 of FIG. 2.

The exemplary system 200 may comprise a fractional sample adjust 212, a line delay 214, a first Hilbert filter 216, an adder 218, a second Hilbert filter 220, a first multiplexer 234, a second multiplexer 236, a subtracter 238, a multiplier 252, a low-pass filter 254 and a check module 256.

As mentioned previously, various components of the exemplary system 200 may share various characteristics with the exemplary system 100 illustrated in FIG. 1. For example and without limitation, the polarity reference signal generation module 110 may share various characteristics with the fractional sample adjust 212, line delay 214, first Hilbert filter 216, summer 218 and second Hilbert filter 220.

For example, a color synchronization signal, which for this exemplary illustration is a PAL subcarrier burst signal, may be input to the system 200. The fractional sample adjust ("FSA") 212 may, in various exemplary scenarios, perform sub-sample adjustments in the received subcarrier burst signal when desired to enhance processing. The output of the FSA 212 is indicated as signal "A" in FIGS. 2 and 3. Row "A" in the vector diagram 300 shows the subcarrier burst signal "A" shifting +/−90 degrees between adjacent video lines, which is in accordance with the PAL standard.

The line delay 214 may delay the subcarrier burst signal by one line to produce signal "B." The one line delay will result in signal "B" representing the subcarrier burst signal of the previous line shifted in phase by 90 degrees. The first Hilbert filter 216 will then shift signal "B" by 90 additional degrees to produce signal "C," which at any time is 90 degrees out of phase with signal "A." The summer 218 then adds signals "A" and "C" to produce signal "D," which will alternate between 90 degrees and 270 degrees from line-to-line, as signal "A" alternates between 135 degrees and 235 degrees from line-to-line. The second Hilbert filter 220 shifts signal "D" by 90 degrees to produce signal "E," which alternates between 180 degrees and 0 degrees from line-to-line, as signal "A" alternates between 135 degrees and 235 degrees from line-to-line. Signal "E" may be utilized as a reference signal indicative of expected subcarrier burst polarity for scan lines of a video.

As mentioned previously, various components of the exemplary system 200 may share various characteristics with the exemplary system 100 illustrated in FIG. 1. For example and without limitation, the polarity monitor module 130 may share various characteristics with the FSA 212, line delay 214, first Hilbert filter 216, first multiplexer 234, second multiplexer 236 and first subtracter 238.

For example, a color synchronization signal, which for this exemplary illustration is a PAL subcarrier burst signal, may be input to the system 200. As explained previously, the FSA 212 may process the subcarrier burst signal to produce signal "A." Also as explained previously, the line delay 214 may process the subcarrier burst signal to produce signal "B," and the first Hilbert filter 216 may process signal "B" to produce signal "C."

The first multiplexer 234 and second multiplexer 236 are configured to (e.g., under control of the check module 256) pass signals "A" and "C" or conversely pass signals "C" and "A" to first and second inputs of the subtracter 238. The output of the subtracter 238, signal "G," may then, for example, correspond to either "A-C" or "C-A," depending on the control input to the multiplexers 234, 236. Output "A-C," in an exemplary scenario with no polarity switching, is illustrated as signal $F_1$ in the vector diagram 300. Similarly, output "C-A," in an exemplary scenario with no polarity switching, is illustrated as signal $F_2$ in the vector diagram 300.

In general operation, the output of the subtracter 238 may, for example, alternate between "A-C" and "C-A" as the color signal polarity switches from line-to-line. Accordingly, depending on an initial state of the polarity, such signal alternation will generally result in one of two sequences for signal "G." The first general sequence for signal "G," labeled $G_{Seq1}$, and the second general sequence for signal "G," labeled $G_{Seq2}$ are presented in the vector diagram 300. Signal sequence $G_{Seq1}$ is, in a non-limiting exemplary scenario, indicative of correct synchronization signal polarity, and signal Sequence $G_{Seq2}$ is indicative of incorrect synchronization signal polarity.

As mentioned previously, various components of the exemplary system 200 may share various characteristics with the exemplary system 100 illustrated in FIG. 1. For example and without limitation, the polarity correctness determination module 150 may share various characteristics with the multiplier 252, low-pass filter 254 and check module 256.

For example, in the exemplary system 200, signal "G," which may be viewed as a non-limiting example of a sequence of signals indicative of monitored color synchronization polarity over a period of time and signal "E," which may be viewed as a non-limiting example of a sequence of signals indicative of desired color synchronization polarity over the period of time, are multiplied by the multiplier 252 and filtered by the low-pass filter 254 to produce signal "H." As with signal "G," the flow diagram 300 shows signal sequence "$H_{Seq1}$," resulting from correct signal sequence "$G_{Seq1}$," and signal sequence "$H_{Seq2}$," resulting from incorrect signal sequence. "$G_{Seq2}$."

The check module 256 may then analyze signal "H," which may generally correspond to either "$H_{Seq1}$" or "$H_{Seq2}$," to determine which of "$H_{Seq1}$" or "$H_{Seq2}$" is being output by the low-pass filter 254, and thus whether the color synchronization polarity of the input video signal is correct or incorrect. The check module 256 may analyze signal "H" in any of a variety of manners, non-limiting examples of which were discussed previously with regard to FIG. 1.

Note that signal H may, for example, be generated and analyzed during the entire duration of the subcarrier burst signal. For example, signal H may be processed at a plurality of instances during the subcarrier burst time period. In a non-limiting exemplary scenario, signal H may be generated and processed 32 times during each burst time period. Also for example, signal H may be processed for any number of video lines. For example and without limitation, the check module 256 may analyze signal "H" for a field/frame of video lines, a portion thereof, a sliding window of lines, a plurality of fields/frames, etc.

For example and without limitation, the check module 256 may accumulate the sign of signal "H" (e.g., negative or positive) for a plurality of instances over a time period. At the end of the time period, the check module 256 may compare the accumulation to one or more thresholds to determine whether sequence "H" is more likely "$H_{Seq1}$" or "$H_{Seq2}$."

Based on the analysis (e.g., statistical analysis) of signal "H," the check module 256 may generate a signal indicative of whether the color synchronization polarity is correct. Such a signal may, for example, be utilized to control the outputs of the first multiplexer 234 and the second multiplexer 236, which as explained previously, control whether signal "G" is representative of "A-C" or "C-A." Such a signal may also be utilized by other video signal processing modules (e.g., a chroma demodulator) to process the incoming video signal with the correct polarity.

The previous exemplary system 200 was presented to provide specific illustrations of various generally broader aspects of the present invention. Accordingly, the scope of various aspects of the present invention should not be limited by characteristics of the previously discussed exemplary system 200.

Figure 4:
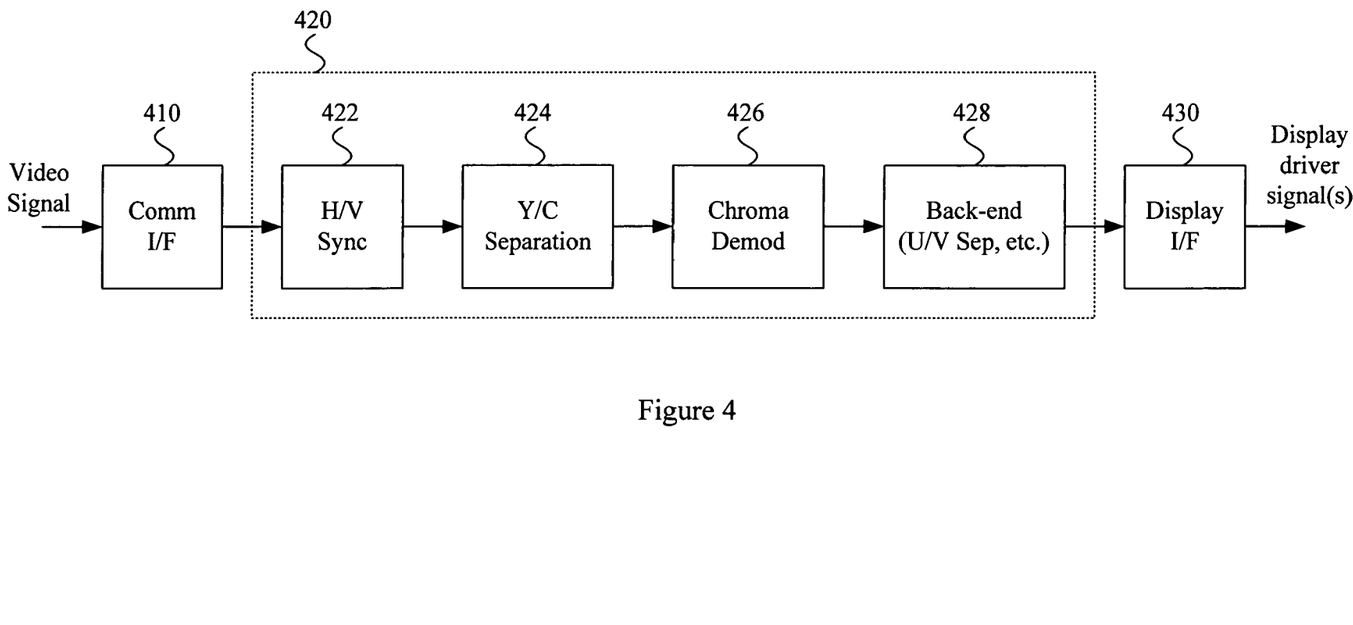
FIG. 4 is a video processing system comprising a system for controlling color synchronization polarity, in accordance with various aspects of the present invention.

FIG. 4 is a block diagram of a video processing system 400 comprising a system for controlling color synchronization polarity, in accordance with various aspects of the present invention. The exemplary video processing system 400 may, for example and without limitation, share various characteristics with the exemplary systems 100, 200 illustrated in FIGS. 1-2 and discussed previously.

The exemplary video processing system 400 may, for example, comprise a communication interface module 410, a video decoder module 420 and a display interface module 430. The communication interface module 410 may comprise characteristics of any of a variety of types of communication interface modules. For example and without limitation, the communication interface module 410 may be adapted to receive video information from any of a variety of video information sources. For example, the communication interface module 410 may be adapted to received one or more video signals from a satellite communication system, a cable television system, a computer communication system (e.g., a LAN or the Internet), a video information storage system, etc. Accordingly, the scope of various aspects of the present invention should not be limited by characteristics of any particular communication interface module.

The video decoder module 420 may, for example, be adapted to receive one or more encoded video signals from the communication interface module 410, decode such video signals and output corresponding decoded video signals. The video decoder module 420 may comprise characteristics of any of a variety of video decoder modules or sub-modules.

For example and without limitation, the video decoder module 420 may comprise a horizontal/vertical synchronization module 422 generally adapted to extract horizontal and vertical video synchronization information from a video signal. The video decoder module 420 may also comprise a luminance/chrominance separation module 424 generally adapted to separate luma and chroma signals from a composite video signal. The video decoder module 420 may further comprise a chroma demodulation module 426 generally adapted to demodulate a chroma signal. The video decoder module 420 may also, for example, comprise a back-end module 428 adapted to perform various video signal-processing functions (e.g., U/V separation, etc.).

The video decoder module 420 may, for example and without limitation, share various characteristics with the exemplary systems 100, 200 illustrated in FIGS. 1-2 and discussed previously. In a non-limiting exemplary scenario, the luminance/chrominance separation module 424 may comprise various characteristics of the exemplary systems 100, 200. For example, such a luminance/chrominance separation module 424 may output color synchronization polarity information in a switching signal to the chroma demodulation module 426, which may then utilize the color synchronization polarity information to determine the manner of demodulating a chroma signal.

The display interface module 430 may be adapted to received decoded video signals from the decoder module 420 and output at least one display driver signal representative of one or more encoded video signals received by the communication interface module 410 and decoded by the video decoder module 420.

The previous exemplary video processing system 400 was presented to provide specific illustrations of various generally broader aspects of the present invention. Accordingly, the scope of various aspects of the present invention should not be limited by characteristics of the previously discussed exemplary system 400.

Figure 5:
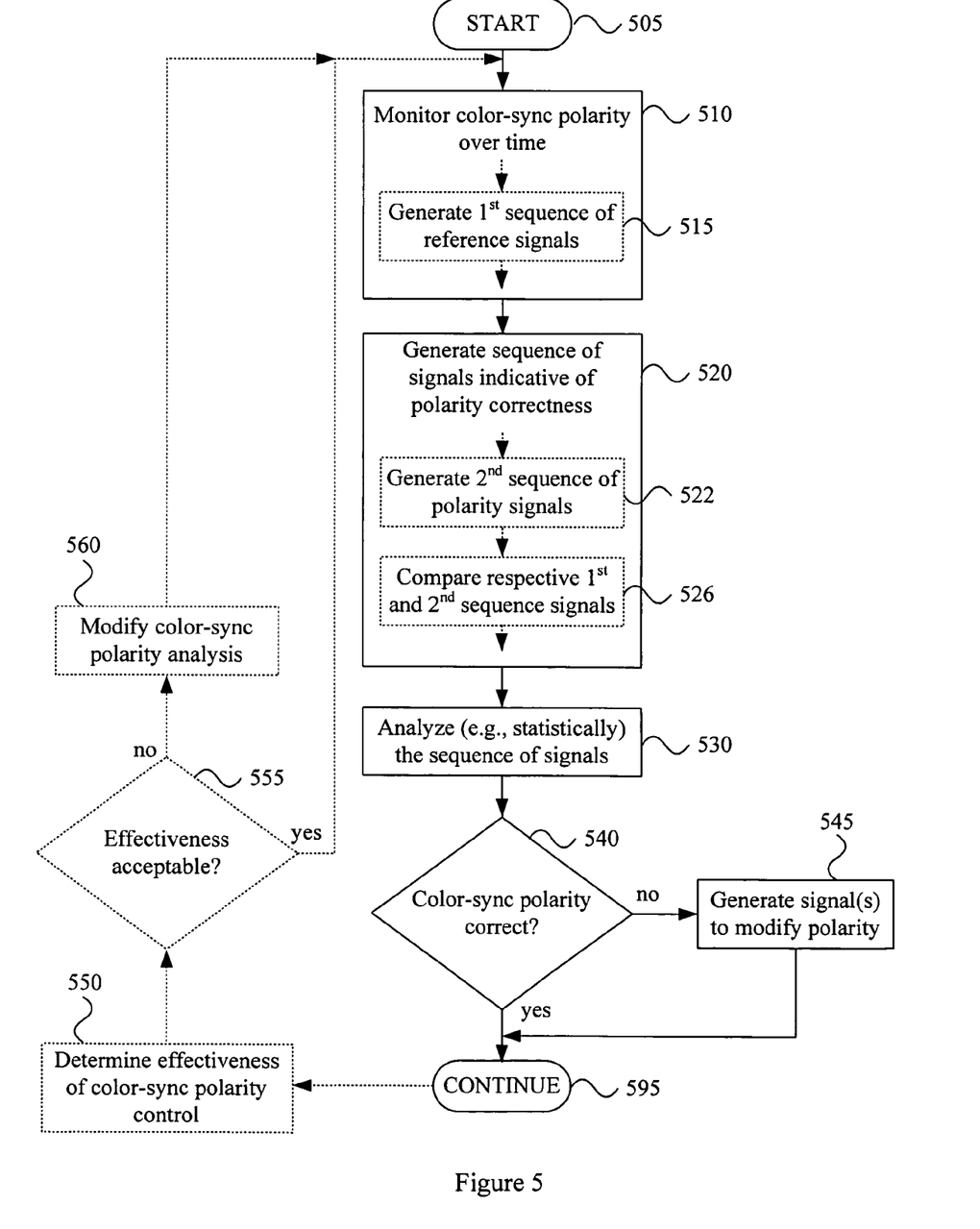
FIG. 5 is a flow diagram illustrating a method for controlling color synchronization polarity in a video decoder, in accordance with various aspects of the present invention.

FIG. 5 is a flow diagram illustrating a method 500 for controlling color synchronization polarity in a video decoder, in accordance with various aspects of the present invention. The exemplary method 500 may, for example and without limitation, share various functional characteristics with the exemplary systems 100, 200, 400 illustrated in FIGS. 1-2 and 4 and discussed previously.

The exemplary method 500 may begin executing at step 505. The exemplary method 500 may begin executing for any of a large variety of reasons. For example and without limitation, the exemplary method 500 may begin executing in response to a video processing system (or chip) powering up or resetting. Also for example, the exemplary method 500 may begin executing in response to a signal received from an external source (e.g., from an external automated system or from a user). Further for example, the exemplary method 500 may begin executing in response to timer expiration or a detected video processing system condition. Accordingly, the scope of various aspects of the present invention should not be limited by characteristics of any particular initiating cause or condition.

The exemplary method 500 may, at step 510, comprise monitoring color synchronization polarity at a plurality of instances over a period of time. Step 510 may, for example and without limitation, share various functional characteristics with the polarity monitor module 130 of the exemplary system 100 illustrated in FIG. 1 and discussed previously.

For example and without limitation, step 510 may comprise monitoring color synchronization polarity of a subcarrier burst signal of a video line at a plurality of points (e.g., 2, 4, 8, 16, 32, 64, 100 or any number of points) during the subcarrier burst period. Also for example, step 510 may comprise monitoring color synchronization polarity of the subcarrier burst signal for a plurality of video lines (e.g., 2, 4, 8, 100, all lines of a video field, all lines of a video frame, all lines of a plurality of video frames, a sliding window of video lines, etc.). Note that the period of time over which step 510 may comprise monitoring color synchronization polarity might comprise a single continuous period or might comprise a set of discrete periods. Also note that the period of time may be static or dynamic, which will be discussed in more detail later. The scope of various aspects of the present invention should not be limited by characteristics of any particular period of time over which color synchronization polarity might be monitored.

Step 510 may comprise monitoring color synchronization polarity in any of a variety of manners. For example and without limitation, step 510 may comprise monitoring color synchronization polarity by determining polarity of a monitored color synchronization signal (e.g., a PAL subcarrier burst signal) of a current video line in relation to polarity of a monitored color synchronization signal of a previous video line. Such a comparison may then, for example, result in an indication of relative color synchronization polarity between adjacent video lines. Also for example, the step 510 may comprise monitoring color synchronization polarity by comparing polarity of a monitored color synchronization signal of a current video line with respective polarities of a plurality of previous video lines.

As a non-limiting exemplary illustration of monitoring color synchronization polarity, refer to sub-step 515, which may, for example, comprise generating a first sequence of signals indicative of monitored color synchronization polarity over a period of time. Sub-step 515 may, for example and without limitation, share various functional characteristics with the FSA 212, line delay 214, first Hilbert filter 216, first multiplexer 234, second multiplexer 236 and subtracter 238 of the system 200 illustrated in FIG. 2 and discussed previously.

For example, sub-step 515 may comprise processing a color synchronization signal, which for this exemplary illustration may comprise a PAL subcarrier burst signal. With reference to FIG. 3, sub-step 515 may, for example, comprise processing the subcarrier burst signal by adjusting the subcarrier burst signal by fractional samples when desired to enhance processing. The output of such a fractional sample adjustment may be exemplified by signal "A" in the vector diagram 300. Row "A" in the vector diagram 300 shows the subcarrier burst signal "A" shifting +/−90 degrees between adjacent video lines, which is in accordance with the PAL standard. Note that the fractional sample adjustment is merely exemplary and may or may not be necessary, depending on the particular processing scenario.

Exemplary sub-step 515 may also comprise delaying the subcarrier burst signal by one line to produce signal "B." The one-line delay may result in signal "B" representing the subcarrier burst signal of the previous line shifted in phase by 90 degrees. Exemplary sub-step 515 may also comprise shifting signal "B" by 90 additional degrees to produce signal "C," which at any time is 90 degrees out of phase with signal "A." Sub-step 515 may additionally, for example, comprise generating signal "G," which corresponds to either "A-C" or "C-A." Output "A-C," in an exemplary scenario with no polarity switching, is illustrated as signal $F_1$ in the vector diagram 300. Similarly, output "C-A," in an exemplary scenario with no polarity switching, is illustrated as signal $F_2$ in the vector diagram 300.

In general operation, a system implementing the exemplary sub-step 515 may alternate signal "G" between "A-C" and "C-A" as the color signal polarity switches from line-to-line. Accordingly, depending on an initial state of the polarity, such signal alternation will generally result in one of two general sequences for signal "G." The first general sequence for signal "G," labeled $G_{Seq1}$, and the second general sequence for signal "G," labeled $G_{Seq2}$, are presented in the vector diagram 300. Signal sequence $G_{Seq1}$ is, in a non-limiting exemplary scenario, indicative of correct color synchronization polarity, and signal sequence $G_{Seq2}$ is indicative of incorrect color synchronization polarity.

In general, step 510 may comprise monitoring color synchronization polarity at a plurality of instances over a period of time. Accordingly, the scope of various aspects of the present invention should not be limited by characteristics of any particular manner of monitoring color synchronization polarity.

The exemplary method 500 may, at step 520, comprise generating a sequence of signals indicative of color synchronization polarity correctness at the plurality of instances. Step 520 may, for example and without limitation, share various functional characteristics with the reference generating module 110 and the polarity conformance determination module 150 of the exemplary system 100 illustrated in FIG. 1 and discussed previously.

For example and without limitation, step 520 may comprise generating and outputting a sequence (or series) of signals indicative of the color synchronization polarity correctness at a plurality of instances over a period of time. Such a sequence of signals may, for example, indicate color synchronization polarity of a sampled color synchronization signal (e.g., a subcarrier burst signal) relative to a corresponding color synchronization polarity reference signal. Also for example, step 520 may comprise generating and outputting any of a large variety of signals (e.g., digital and/or analog signals) indicative of color synchronization polarity correctness at a plurality of instances over a period of time.

As a non-limiting exemplary illustration of generating a sequence of signals indicative of color-sync polarity correctness, refer to sub-step 522, which may, for example, comprise generating a second sequence of signals indicative of correct color synchronization polarity over the period of time. Exemplary sub-step 522 may, for example and without limitation, share various functional characteristics with the FSA 212, line delay 214, first Hilbert filter 216, adder 218 and second Hilbert filter 220 of the exemplary system 200 illustrated in FIG. 2 and discussed previously.

For example, sub-step 522 may comprise processing a color synchronization signal, which for this exemplary illustration may comprise a PAL subcarrier burst signal. Exemplary step 522 may comprise generating signals "A," "B" and "C," as discussed previously with regard to exemplary sub-step 515.

Exemplary sub-step 522 may then comprise adding signals "A" and "C" to produce signal "D," which alternates between 90 degrees and 270 degrees from line-to-line, as signal "A" alternates between 135 degrees and 235 degrees from line-to-line. Exemplary sub-step 522 may then comprise shifting signal "D" by 90 degrees to produce signal "E," which alternates between 180 degrees and 0 degrees from line-to-line, as signal "A" alternates between 135 degrees and 235 degrees from line-to-line. Signal "E" may, for example, be utilized as a reference signal indicative of correct subcarrier burst polarity for scan lines of a video.

Continuing the non-limiting exemplary illustration of generating a sequence of signals indicative of color-sync polarity correctness, sub-step 526 may comprise comparing corresponding signals of the first and second sequences of signals (e.g., as generated at sub-steps 515 and 522). Sub-step 526 may, for example and without limitation, share various functional characteristics with the multiplier 252 and low-pass filter 254 of the system 200 illustrated in FIG. 2 and discussed previously.

For example, sub-step 526 may comprise multiplying signal "G," which may be viewed as a non-limiting example of a sequence of signals indicative of monitored color synchronization polarity over a period of time, and signal "E," which may be viewed as a non-limiting example of a sequence of signals indicative of correct color synchronization polarity over the period of time. Sub-step 526 may then comprise low-pass filtering the product "G*E" to produce signal "H." As with signal "G," the flow diagram 300 shows signal sequence "$H_{Seq1}$," resulting from correct signal sequence "$G_{Seq1}$," and signal sequence "$H_{Seq2}$," resulting from incorrect signal sequence "$G_{Seq2}$."

In general, step 520 may comprise generating a sequence of signals indicative of color synchronization polarity correctness at the plurality of instances. Accordingly, the scope of various aspects of the present invention should not be limited by characteristics of any particular type of signal that might represent monitored color synchronization polarity or any particular manner of generating such signal.

It should be noted that various aspects of steps 510 and 520 were illustrated with reference to sub-steps 515, 522 and 526 as non-limiting examples. Accordingly, the scope of various aspects of the present invention should not be limited by characteristics of the previously discussed steps 515, 522 and 526.

The exemplary method 500 may, at step 530, comprise analyzing (e.g., statistically analyzing) the sequence of signals generated at step 520. Such analysis may, for example, comprise determining, based at least in part on the statistical analysis of the sequence of signals, whether color synchronization polarity is correct (e.g., according to standard, as expected for processing, etc.). Step 530 may, for example and without limitation, share various functional characteristics with the polarity conformance determination module 150 of the exemplary system 100 illustrated in FIG. 1.

Step 530 may comprise analyzing information (e.g., from a sequence of signals) indicative of color synchronization polarity correctness in any of a variety of manners. For example and without limitation, step 530 may comprise statistically analyzing signals indicative of color synchronization polarity correctness generated at step 520. The results of such an analysis may, in turn, be utilized to generate a signal that may, for example, be utilized by subsequent steps to switch color synchronization polarity to achieve proper video signal decoding.

In a non-limiting exemplary scenario, as discussed previously, step 520 may comprise generating a sequence of signals indicative of monitored color synchronization polarity correctness. In such a non-limiting exemplary scenario, step 530 may comprise analyzing (e.g., statically analyzing) such a sequence of signals to determine whether the monitored color synchronization polarity is correct.

In a non-limiting exemplary scenario, step 530 may comprise statistically analyzing the sequence of signals by accumulating (or summing) logic values, polarities, values, or signs over a time period (e.g., any of the time periods discussed previously) and comparing the accumulation results to one or more thresholds. Also for example, step 530 may comprise statistically analyzing the sequence of signals by summing the values of the signals over a time period and comparing the sum to one or more thresholds. Further for example, step 530 may comprise statistically analyzing the sequence of signals by determining an indication of statistical variance (or standard deviation) and comparing the indication of statistical variance to a threshold. In general, in the non-limiting exemplary scenario, step 530 may comprise analyzing (e.g., statistically analyzing) information indicative of color synchronization polarity correctness in any of a variety of manners. Accordingly, the scope of various aspects of the present invention should not be limited by characteristics of any particular manner of analyzing such information.

For example and without limitation, step 530 may share various characteristics with the check module 256 of the exemplary system 200 illustrated in FIG. 2 and discussed previously. As a non-limiting example, consider signal "H," which was discussed previously with regard to exemplary steps 515, 522 and 526. Step 530 may comprise analyzing such a signal to determine whether color synchronization polarity is correct.

For example, step 530 may comprise analyzing signal "H," which may generally correspond to either "$H_{Seq1}$" or "$H_{Seq2}$," to determine which of "$H_{Seq1}$" or "$H_{Seq2}$" is being generated, and thus whether the color synchronization polarity of the input video signal is correct or incorrect. Step 530 may generally comprise analyzing signal "H" in any of a variety of manners.

Note that signal "H" may, for example, be generated and analyzed during the entire duration of the subcarrier burst signal. For example, signal "H" may be processed at a plurality of instances during the subcarrier burst time period. In a non-limiting exemplary scenario, step 530 may comprise generating and analyzing signal "H" 32 times during each burst time period. Also for example, step 530 may comprise analyzing signal "H" for any number of video lines. For example and without limitation, step 530 may comprise analyzing signal "H" for a field/frame of video lines, a portion thereof, a sliding window of lines, a plurality of fields/frames, etc.

For example and without limitation, the step 530 may comprise accumulating the sign of signal "H" (e.g., negative or positive) for a plurality of instances over a time period. At the end of the time period, step 530 may comprise comparing the accumulation to one or more thresholds to determine whether sequence "H" is more likely "$H_{Seq1}$" or "$H_{Seq2}$."

Based on the analysis (e.g., statistical analysis) of signal "H," step 530 may comprise generating a signal indicative of whether the color synchronization polarity is correct. Such a signal may, for example, be utilized to control whether signal "G" is representative of "A-C" or "C-A." Such a signal may also be utilized by other video signal processing modules (e.g., a chroma demodulator) to process the incoming color video signal with the correct polarity.

In general, step 530 may comprise analyzing one or more signals (e.g., a sequence of signals) indicative of color synchronization polarity correctness, and determining based at least in part on the analysis of such signals, whether color synchronization polarity is correct. Accordingly, the scope of various aspects of the present invention should not be limited by any particular manner of analyzing one or more signals indicative of color synchronization polarity correctness.

The exemplary method 500 may, at step 540, comprise controlling execution flow of the exemplary method 500. If, for example, it is determined (e.g., at step 530 or step 540) that the present color synchronization polarity is correct, then step 540 may direct execution flow of the exemplary method 500 to step 595 for continued processing. If, however, it is determined (e.g., at step 530 or step 540) that the present color synchronization polarity is not correct, then step 540 may direct execution flow of the exemplary method 500 to step 545.

The exemplary method may, at step 545, comprise controlling color synchronization polarity based, at least in part, on the polarity correctness determination. For example and without limitation, step 545 may comprise generating a switching signal to cause a shift in signal polarity. Also for example, step 545 may comprise communicating a signal indicative of the polarity correctness determination to a signal processing module (e.g., a chroma demodulator) that bases its processing on such polarity correctness. Further for example, step 545 may comprise storing a signal value in a memory location that a signal-processing module may access to determine if present color synchronization polarity is correct. Accordingly, the scope of various aspects of the present invention should not be limited by any particular manner of controlling color synchronization polarity.

As mentioned previously, at step 595, the exemplary method 500 may comprise performing continued processing (e.g., continued video processing). Step 595 may comprise performing any of a large variety of continued processing. For example and without limitation, such continued processing may comprise generating a video output for a user. Also for example, such continued processing may comprise receiving and responding to user input. Further for example, such continued processing may comprise switching video signals or changing the manner in which a video image is presented. Accordingly, the scope of various aspects of the present invention should not be limited by characteristics of any particular type of continued processing.

The flow diagram of the method 500 in FIG. 5 presents a non-limiting example of such continued processing (e.g., as indicated by the dashed lines and boxes). In the non-limiting exemplary scenario, the method 500 may, at step 550, comprise determining effectiveness of the color synchronization polarity control. Step 550 may comprise determining effectiveness of color synchronization polarity control in any of a variety of manners.

For example and without limitation, step 550 may comprise determining effectiveness by, at least in part, determining video output quality. Note that such a determination may be completely automatic or may also utilize information received from a user. Also for example, step 550 may comprise determining effectiveness by, at least in part, determining the extent to which color synchronization polarity is switched (or inappropriately switched). Further for example, step 550 may comprise determining effectiveness by, at least in part, determining the extent to which color synchronization polarity is being corrected. Accordingly, the scope of various aspects of the present invention should not be limited by characteristics of any particular manner of determining effectiveness of color synchronization polarity control.

Continuing the non-limiting exemplary scenario, step 555 may control execution flow of the method 500. If, for example, it is determined (e.g., at step 550) that the present effectiveness of the color synchronization polarity control is acceptable, then step 555 may direct execution flow of the exemplary method 500 back up to step 510 for continued color synchronization control. If, however, it is determined that the present effectiveness of the color synchronization polarity control is not acceptable, then step 555 may direct execution flow of the exemplary method 500 to step 560, which will be discussed next.

Continuing the non-limiting exemplary scenario, the method 500 may, at step 560, comprise modifying the analysis (e.g., the statistical analysis) of the sequence of signals based, at least in part, on the determined effectiveness (e.g., as determined at step 550). Step 560 may comprise modifying the analysis characteristics in any of a variety of manners. For example and without limitation, in an exemplary scenario where the analysis includes comparison to a threshold, step 560 may comprise modifying the threshold. Also for example, step 560 may comprise modifying the period of time over which the analysis is performed (e.g., changing a sliding window duration, number of lines, number of fields/frames, etc.). Further for example, step 560 may comprise changing a set of signals that is being analyzed. Still further for example, step 560 may comprise modifying the number of signals or samples being processed. Accordingly, the scope of various aspects of the present invention should not be limited by any particular manner in which the analysis may be modified to improve effectiveness of the color synchronization polarity control.

The previous exemplary method 500 was presented to provide specific illustrations of various generally broader aspects of the present invention. Accordingly, the scope of various aspects of the present invention should not be limited by characteristics of the previously discussed exemplary method 500.

In summary, various aspects of the present invention provide a system and method for automatically controlling color synchronization polarity during video decoding. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for controlling color synchronization polarity in a video decoder, the system comprising at least one module adapted to:
   monitor color synchronization polarity at a plurality of instances over a period of time;
   generate a first sequence of signals indicative of monitored color synchronization polarity over the period of time;
   generate a second sequence of signals indicative of correct color synchronization polarity over the period of time;
   compare corresponding signals of the first and second sequence of signals;
   generate a third sequence of signals indicative of color synchronization polarity correctness at the plurality of instances based, at least in part, on the compared corresponding signals of the first and second sequence of signals;
   statistically analyze the third sequence of signals;
   determine, based at least in part on the statistical analysis of the third sequence of signals, whether color synchronization polarity is correct; and
   control color synchronization polarity based, at least in part, on the polarity correctness determination.

2. The system of claim 1, wherein the at least one module is adapted to statistically analyze the third sequence of signals by accumulating the respective signs of the sequence of signals over the time period and comparing the accumulation to a threshold.

3. The system of claim 1, wherein the at least one module is adapted to statistically analyze the third sequence of signals by summing the respective values of the sequence of signals and comparing the sum to a threshold.

4. The system of claim 1, wherein the period of time comprises a plurality of subcarrier burst time periods of a plurality of respective video lines.

5. The system of claim 1, wherein the at least one module is adapted to:
   determine effectiveness of the color synchronization polarity control; and
   modify the statistical analysis of the sequence of signals based, at least in part, on the determined effectiveness.

6. The system of claim 5, wherein the at least one module is adapted to determine effectiveness of the color synchronization polarity control by, at least in part, determining video output quality.

7. The system of claim 5, wherein the at least one module is adapted to determine effectiveness of the color-sync polarity control by determining the extent to which color synchronization polarity is being switched.

8. The system of claim 2, wherein the at least one module is adapted to:
   determine effectiveness of the color synchronization polarity control; and
   modify the threshold based, at least in part, on the determined effectiveness.

9. The system of claim 1, wherein the at least one module is adapted to:
   determine effectiveness of the color synchronization polarity control; and
   modify the period of time based, at least in part, on the determined effectiveness.

10. The system of claim 1, wherein the at least one module is adapted to monitor color synchronization polarity of a PAL video signal.

11. The system of claim 1, wherein the at least one module is integrated in a single integrated circuit.

12. The system of claim 1, further comprising:
   a communication interface module adapted to receive a video signal;
   a video decoder module comprising the at least one module, wherein the video decoder module is adapted to decode a video signal received by the communication interface module; and
   a display interface module that is adapted to output at least one display driver signal representative of a video signal decoded by the video decoder module.

13. A method for automatically controlling color-sync polarity during video decoding, the method comprising:
   monitoring color synchronization polarity at a plurality of instances over a period of time, comprising generating a first sequence of signals indicative of monitored color synchronization polarity over the period of time;
   generating a sequence of signals indicative of color synchronization polarity correctness at the plurality of instances, comprising:
      generating a second sequence of signals indicative of correct color synchronization polarity over the period of time; and
      comparing corresponding signals of the first and second sequences of signals;
   statistically analyzing the sequence of signals;
   determining, based at least in part on the statistical analysis of the sequence of signals, whether color synchronization polarity is correct; and
   controlling color synchronization polarity based, at least in part, on the polarity correctness determination.

14. The method of claim 13, wherein statistically analyzing the sequence of signals comprises accumulating the respective signs of the sequence of signals over the time period and comparing the accumulation to a threshold.

15. The method of claim 13, wherein statistically analyzing the sequence of signals comprises summing the respective values of the sequence of signals and comparing the sum to a threshold.

16. The method of claim 13, wherein the period of time comprises a plurality of subcarrier burst time periods of a plurality of respective video lines.

17. The method of claim 13, further comprising:
determining effectiveness of the color synchronization polarity control; and
modifying the statistical analysis of the sequence of signals based, at least in part, on the determined effectiveness.

18. The method of claim 17, wherein determining effectiveness of the color synchronization polarity control comprises determining video output quality.

19. The method of claim 17, wherein determining effectiveness of the color synchronization polarity control comprises determining the extent to which color synchronization polarity is being switched.

20. The method of claim 14, further comprising:
determining effectiveness of the color synchronization polarity control; and
modifying the threshold based, at least in part, on the determined effectiveness.

21. The method of claim 13, further comprising:
determining effectiveness of the color synchronization polarity control; and
modifying the period of time based, at least in part, on the determined effectiveness.

22. The method of claim 13, wherein monitoring color synchronization polarity at a plurality of instances over a period of time comprises monitoring color synchronization polarity of a PAL video signal.

* * * * *